(12) United States Patent
Hamad

(10) Patent No.: US 11,629,684 B2
(45) Date of Patent: Apr. 18, 2023

(54) MULTI-STAGED COWL FOR A HYDROKINETIC TURBINE

(71) Applicant: TELESYSTEME ENERGIE LTEE., Montreal (CA)

(72) Inventor: Imad Hamad, Pierrefonds (CA)

(73) Assignee: TELESYSTEME ENERGIE LTEE, Montreal (CA)

( * ) Notice: Subject to any disclaimer, the term of this patent is extended or adjusted under 35 U.S.C. 154(b) by 244 days.

(21) Appl. No.: 16/818,288

(22) Filed: Mar. 13, 2020

(65) Prior Publication Data

US 2020/0291916 A1    Sep. 17, 2020

Related U.S. Application Data

(60) Provisional application No. 62/818,252, filed on Mar. 14, 2019.

(51) Int. Cl.
 *F03B 3/00*      (2006.01)
 *F03B 11/02*    (2006.01)
 *F03B 17/06*    (2006.01)

(52) U.S. Cl.
 CPC .............. *F03B 3/00* (2013.01); *F03B 11/02* (2013.01); *F03B 17/06* (2013.01)

(58) Field of Classification Search
 CPC .......... F03B 17/06; F03B 17/061; F03B 3/16; F03B 3/18; F03B 11/02; F03B 3/00; F03B 3/04; F03B 13/10; F05B 2240/12; F05B 2240/13; F05B 2250/14
 See application file for complete search history.

(56) References Cited

U.S. PATENT DOCUMENTS

| | | | |
|---|---|---|---|
| 3,353,028 A | 11/1967 | Braikevitch et al. |
| 3,904,323 A | 9/1975 | Martin et al. |
| 4,191,505 A | 3/1980 | Kaufman |
| 4,204,799 A | 5/1980 | de Geus |

(Continued)

FOREIGN PATENT DOCUMENTS

| CN | 104006078 B | 8/2014 | |
|---|---|---|---|
| DE | 10036307 A1 * | 2/2002 | ............ F03B 17/061 |

(Continued)

OTHER PUBLICATIONS

EP1550807 Machine Translation (Year: 2022).*

(Continued)

*Primary Examiner* — Richard A Edgar
(74) *Attorney, Agent, or Firm* — Kinney & Lange, P.A.

(57) ABSTRACT

The multi-staged cowl described herein allows to increase and maximize water mass flow and pressure drop at the runner cross-section of a hydrokinetic turbine so as to maximize produced power output, while respecting dimensional constraints provided by a shallow body of water, a river for example, in which the hydrokinetic turbine can be submerged. The multi-staged cowl described herein can thus be configured so as to allow water to flow through the hydrokinetic turbine at a substantially stable water mass flow, eliminating instability, avoiding vortices, minimizing cavitation and avoiding fluid separation to negligible levels, and can include an inlet, an outlet and multiple stages which can extend between the inlet and the outlet, so that water can flow therethrough in a water flow direction.

21 Claims, 8 Drawing Sheets

(56) References Cited

U.S. PATENT DOCUMENTS

| | | | |
|---|---|---|---|
| 4,320,304 | A | 3/1982 | Karlsson et al. |
| 4,367,413 | A | 1/1983 | Nair |
| 4,367,890 | A | 1/1983 | Spirk |
| 4,508,973 | A | 4/1985 | Payne |
| 5,440,176 | A | 8/1995 | Haining |
| 6,111,332 | A | 8/2000 | Post |
| 6,472,768 | B1 | 10/2002 | Salls |
| 6,475,045 | B2 | 11/2002 | Schultz et al. |
| 6,657,344 | B2 | 12/2003 | Post |
| 6,887,031 | B1 | 5/2005 | Tocher |
| 6,954,006 | B2 | 10/2005 | Williams, Jr. |
| 7,190,087 | B2 | 3/2007 | Williams |
| 7,331,762 | B2 | 2/2008 | Fraenkel |
| 7,425,772 | B2 | 9/2008 | Novo Vidal |
| 7,453,166 | B2 | 11/2008 | Power et al. |
| 7,484,363 | B2 | 2/2009 | Reidy et al. |
| 7,605,486 | B2 | 10/2009 | Bridwell |
| 7,713,020 | B2 * | 5/2010 | Davidson ............... F03B 3/183 415/4.4 |
| 7,891,953 | B2 | 2/2011 | Gray et al. |
| 7,902,706 | B2 | 3/2011 | Thibodeau et al. |
| 8,123,457 | B2 | 2/2012 | Krouse |
| 8,222,762 | B2 | 7/2012 | Borgen |
| 8,294,290 | B2 | 10/2012 | Da Silva |
| 8,303,241 | B2 | 11/2012 | Corren et al. |
| 8,421,254 | B2 | 4/2013 | Desmeules |
| 8,466,595 | B2 | 6/2013 | Spooner |
| 8,482,141 | B2 | 7/2013 | Aussem et al. |
| 8,558,424 | B2 | 10/2013 | Auten |
| 8,587,144 | B2 | 11/2013 | Urch |
| 8,633,609 | B2 | 1/2014 | Cornelius et al. |
| 8,662,792 | B2 | 3/2014 | Achard |
| 8,864,439 | B2 | 10/2014 | Williams |
| 8,933,598 | B2 | 1/2015 | Dunne et al. |
| 9,097,233 | B1 | 8/2015 | Ramsey |
| 9,284,709 | B2 | 3/2016 | Ives et al. |
| 9,359,991 | B2 | 6/2016 | Davey et al. |
| 9,458,819 | B2 | 10/2016 | Wanni |
| 9,627,941 | B1 | 4/2017 | Wojdylo |
| 9,745,951 | B1 | 8/2017 | Doyle |
| 9,765,647 | B2 | 9/2017 | Ives et al. |
| 9,850,877 | B2 | 12/2017 | McBride |
| 10,066,605 | B2 | 9/2018 | Perriere |
| 2007/0241566 | A1 | 10/2007 | Kuehnle |
| 2008/0232957 | A1 * | 9/2008 | Presz ..................... F03D 13/20 415/220 |
| 2010/0066089 | A1 | 3/2010 | Best et al. |
| 2010/0111689 | A1 | 5/2010 | Davis |
| 2010/0133838 | A1 | 6/2010 | Borgen |
| 2010/0148513 | A1 | 6/2010 | Susman |
| 2011/0018277 | A1 | 1/2011 | Brace |
| 2011/0110770 | A1 | 5/2011 | Spooner et al. |
| 2011/0148118 | A1 | 6/2011 | Burnett |
| 2011/0248505 | A1 * | 10/2011 | Sringer ................... F03B 13/10 29/402.03 |
| 2011/0291419 | A1 | 12/2011 | Dunne et al. |
| 2011/0298216 | A1 | 12/2011 | Ives et al. |
| 2012/0282037 | A1 | 11/2012 | Luppi |
| 2013/0043685 | A1 | 2/2013 | Sireli et al. |
| 2013/0243527 | A1 | 9/2013 | Ayre |
| 2014/0339826 | A1 | 11/2014 | Ko et al. |
| 2014/0353971 | A1 | 12/2014 | Davey |
| 2015/0252547 | A1 | 9/2015 | Ives |
| 2015/0316021 | A1 | 11/2015 | Dunne et al. |
| 2017/0207680 | A1 | 7/2017 | Power et al. |
| 2017/0356417 | A1 | 12/2017 | Doyle |
| 2018/0009512 | A1 | 1/2018 | Dunne et al. |
| 2018/0087484 | A1 * | 3/2018 | Schurtenberger ......... F03B 3/18 |
| 2018/0291867 | A1 | 10/2018 | Cook et al. |
| 2018/0306166 | A1 | 10/2018 | Kuster |

FOREIGN PATENT DOCUMENTS

| | | | | |
|---|---|---|---|---|
| DE | 10036307 | A1 | 2/2002 | |
| DE | 102008037896 | A1 * | 2/2010 | ............ F03B 13/264 |
| EP | 1359320 | A1 | 11/2003 | |
| EP | 1550807 | A1 * | 7/2005 | ............... F03D 1/04 |
| EP | 2951356 | B1 | 12/2015 | |
| EP | 3315804 | A1 | 5/2018 | |
| FR | 3003310 | A1 | 4/2015 | |
| GB | 2447514 | A | 12/2009 | |
| JP | 2005237128 | A | 9/2005 | |
| JP | 2013130110 | A | 7/2017 | |
| JP | 2015048844 | A | 7/2018 | |
| WO | 2005005820 | A1 | 1/2005 | |
| WO | WO-2007107505 | A1 * | 9/2007 | ............. F03B 13/10 |
| WO | 201017869 | A2 | 2/2010 | |
| WO | WO-2011134090 | A1 * | 11/2011 | ............. F03B 11/02 |
| WO | 2014188015 | A1 | 11/2014 | |
| WO | 201580595 | A1 | 6/2015 | |
| WO | 201686328 | A1 | 6/2016 | |
| WO | 2016130984 | A2 | 8/2016 | |
| WO | 2019008372 | A1 | 1/2019 | |

OTHER PUBLICATIONS

DE 10036307 Machine Translation (Year: 2022).*
Supplementary European Search Report dated Nov. 8, 2022, for corresponding European Application No. 20769425.

* cited by examiner

MULTI-STAGED COWL FOR A HYDROKINETIC TURBINE

CROSS-REFERENCE TO RELATED PATENT APPLICATION(S)

The present application claims priority from U.S. Provisional Patent Application No. 62/818,252, filed Mar. 14, 2019 and entitled "DRAFT TUBE ASSEMBLY FOR TURBINE," the disclosure of which is hereby incorporated by reference.

TECHNICAL FIELD

The technical field of the present disclosure generally relates to turbines, and more particularly, to a multi-staged cowl for hydrokinetic turbines.

BACKGROUND

Hydrokinetic turbines, also known as dam-free turbines, are configured to be submerged into a body of water, where water can naturally flow in a water flow direction. Hydrokinetic turbines can include a rotor, a hub, as well as blades, which can radially extend therefrom, for example, so as to form the runner cross-section. Water can thus flow through the turbine, from a section upstream from the runner cross section towards a section downstream from the runner cross-section, so the blades can capture the kinetic energy contained in the water flow. This kinetic energy can be converted into power output so that energy can be produced.

It is known to install draft tubes assemblies or cowls downstream from the hydrokinetic turbine in order to increase the water flow and the pressure drop at the runner cross-section of the turbine in the aim to improve both the turbine overall efficiency and the turbine power output. However, these draft tubes assemblies or cowls are not dimensioned to be submerged into shallow bodies of water, such as rivers. Indeed, reducing the overall height of such assemblies can lead to lengths, as well as cavitation volumes at the runner cross-sections of the turbines, that are not operatively and economically viable.

There is therefore a need for improved draft tubes assemblies or cowls which can be configured to increase the water flow and the pressure drop at the runner cross-section of a hydrokinetic turbine so as to maximize the power output produced, while respecting dimensional constraints provided by a shallow body of water, a river for example, in which the hydrokinetic turbine can be submerged.

SUMMARY

In some implementations, there is provided, a multi-staged cowl for receiving at least part of a hydrokinetic turbine comprising a hub and blades radially extending therefrom, the multi-staged cowl comprising: an inlet; an outlet; and multiple stages extending between the inlet and the outlet for receiving the hydrokinetic turbine therein, the stages defining a water flow channel for flow of water therethrough along a water flow direction from the inlet towards the outlet; wherein the stages define a height substantially constant along the water flow direction; and wherein at least one of the stages defines a width increasing along the water flow direction.

In some implementations, the multiple stages comprise an inlet draft tube comprising: an inlet draft tube inlet; an inlet draft tube outlet; and an inlet peripheral wall extending between the inlet draft tube inlet and the inlet draft tube outlet and defining an inlet water flow channel for flow of water therethrough along the water flow direction from the inlet draft tube inlet towards the inlet draft tube outlet, the inlet peripheral wall comprising an inner surface and an outer surface.

In some implementations, the multiple stages further comprise an intermediate draft tube comprising: an intermediate draft tube inlet configured for receiving the inlet draft tube outlet; an intermediate draft tube outlet; and an intermediate peripheral wall extending between the intermediate draft tube inlet and the intermediate draft tube outlet and defining an intermediate water flow channel for flow of water therethrough along the water flow direction from the intermediate draft tube inlet towards the intermediate draft tube outlet, the intermediate peripheral wall comprising an inner surface and an outer surface.

In some implementations, the multi-staged cowl comprises a first water passage at the intermediate draft tube inlet formed between the outer surface of the inlet peripheral wall and the inner surface of the intermediate peripheral wall for flow of water therethrough from the intermediate draft tube inlet towards the intermediate draft tube outlet.

In some implementations, the cross-section at the intermediate draft tube inlet is greater than the cross-section at the inlet draft tube outlet.

In some implementations, the first water passage extends along the periphery of the inlet draft tube inlet.

In some implementations, the multiple stages further comprise an outlet draft tube comprising: an outlet draft tube inlet configured for receiving the intermediate draft tube outlet; an outlet draft tube outlet; and an outlet peripheral wall extending between the outlet draft tube inlet and the outlet draft tube outlet and defining an outlet water flow channel for flow of water therethrough along the water flow direction from the outlet draft tube inlet towards the outlet draft tube outlet, the outlet peripheral wall comprising an inner surface and an outer surface.

In some implementations, the multi-staged cowl further comprises a second water passage at the outlet draft tube inlet formed between the outer surface of the intermediate peripheral wall and the inner surface of the outlet peripheral wall for flow of water therethrough from the outlet draft tube inlet towards the outlet draft tube outlet.

In some implementations, the cross-section at the outlet draft tube inlet is greater than the cross-section at the intermediate draft tube outlet.

In some implementations, the second water passage extends along the periphery of the intermediate draft tube inlet.

In some implementations, the intermediate draft tube defines an intermediate draft tube width increasing along the water flow direction according to a first non-linear relationship.

In some implementations, the outlet draft tube defines an outlet draft tube width increasing along the water flow direction according to a second non-linear relationship.

In some implementations, the outlet draft tube width increases from the outlet draft tube inlet towards the outlet draft tube outlet.

In some implementations, the inlet draft tube defines an inlet draft tube length and an inlet draft tube width increasing along a segment of the inlet draft tube length according to a third non-linear relationship.

In some implementations, the width at the outlet is greater than the height at the outlet.

In some implementations, the multi-staged cowl further comprises a base for supporting the multiple stages thereon.

In some implementations, the base defines an opened configuration for allowing water to flow underneath the multiple stages in the water flow direction along the length of the multiple stages.

In some implementations, the base comprises a main frame for supporting the multiple stages, and a plurality of supporting legs downwardly extending therefrom.

In some implementations, the base further comprises a levelling mechanism configured to level the multiple stages relative to the water flow direction.

In some implementations, the multi-staged cowl further comprises a hub supporting structure extending from the multiple stages for supporting the at least part of the hydrokinetic turbine in the stages, the hub supporting structure comprising a plurality of spaced apart hub supporting members, the supporting members each extending between the inner surface of the inlet draft tube and the hub.

In some implementations, the multi-staged cowl further comprises an outer reinforcement structure for reinforcing the multiple stages and extending therefrom, the outer reinforcement structure comprising a plurality of spaced apart upper ribs, the upper ribs each upwardly extending from the outer surfaces of the inner, intermediate and outlet draft tubes.

In some implementations, the multi-staged cowl further comprises an inner reinforcement structure for reinforcing the multiple stages, the inner reinforcement structure comprising a plurality of spaced apart struts, the struts each extending between a lower portion and an upper portion of the inner surface of the outlet draft tube.

DETAILED DESCRIPTION

Figure 1:
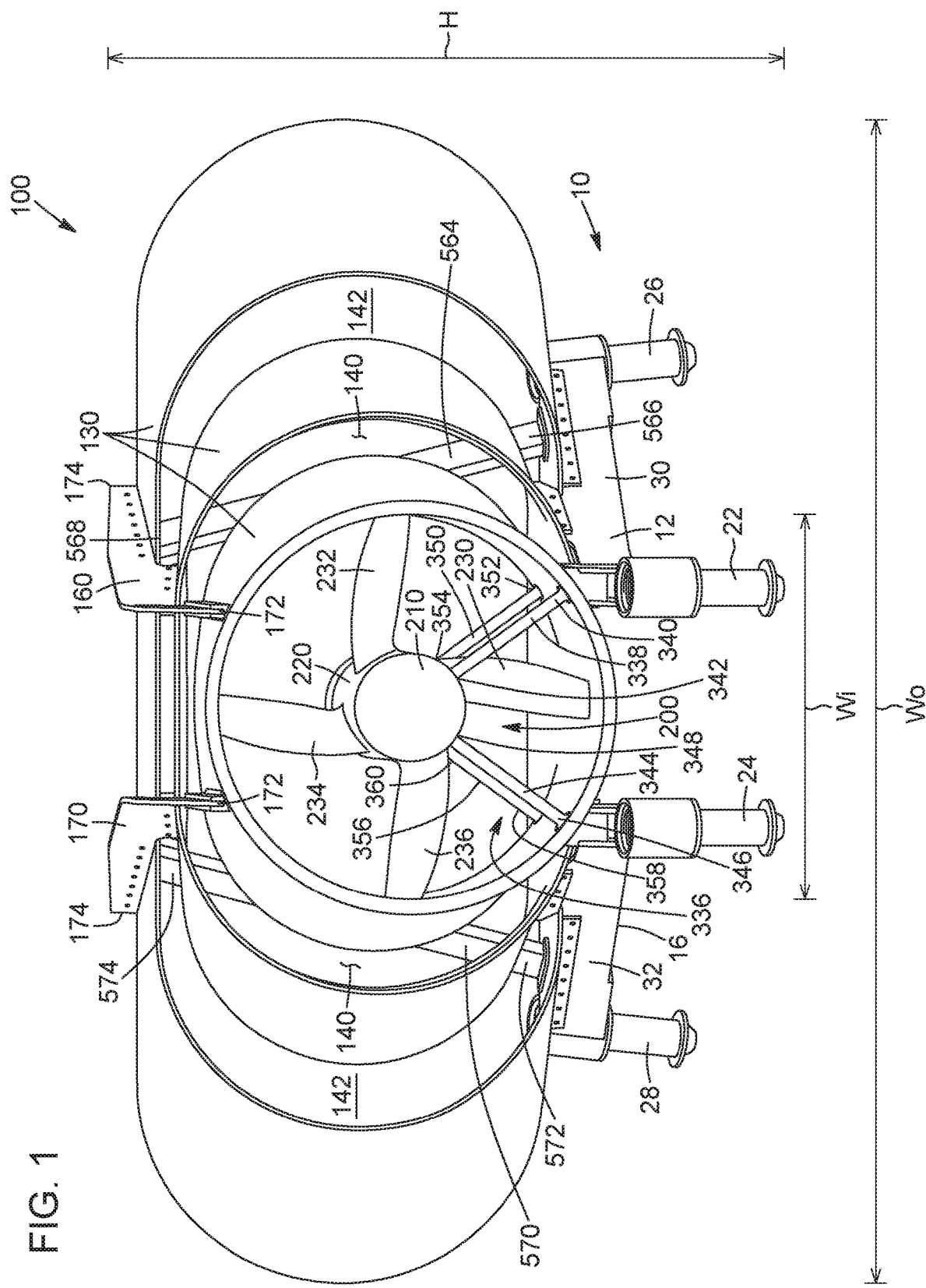
FIG. 1 is a front perspective view of a multi-staged cowl in accordance with one implementation.
Figure 2:
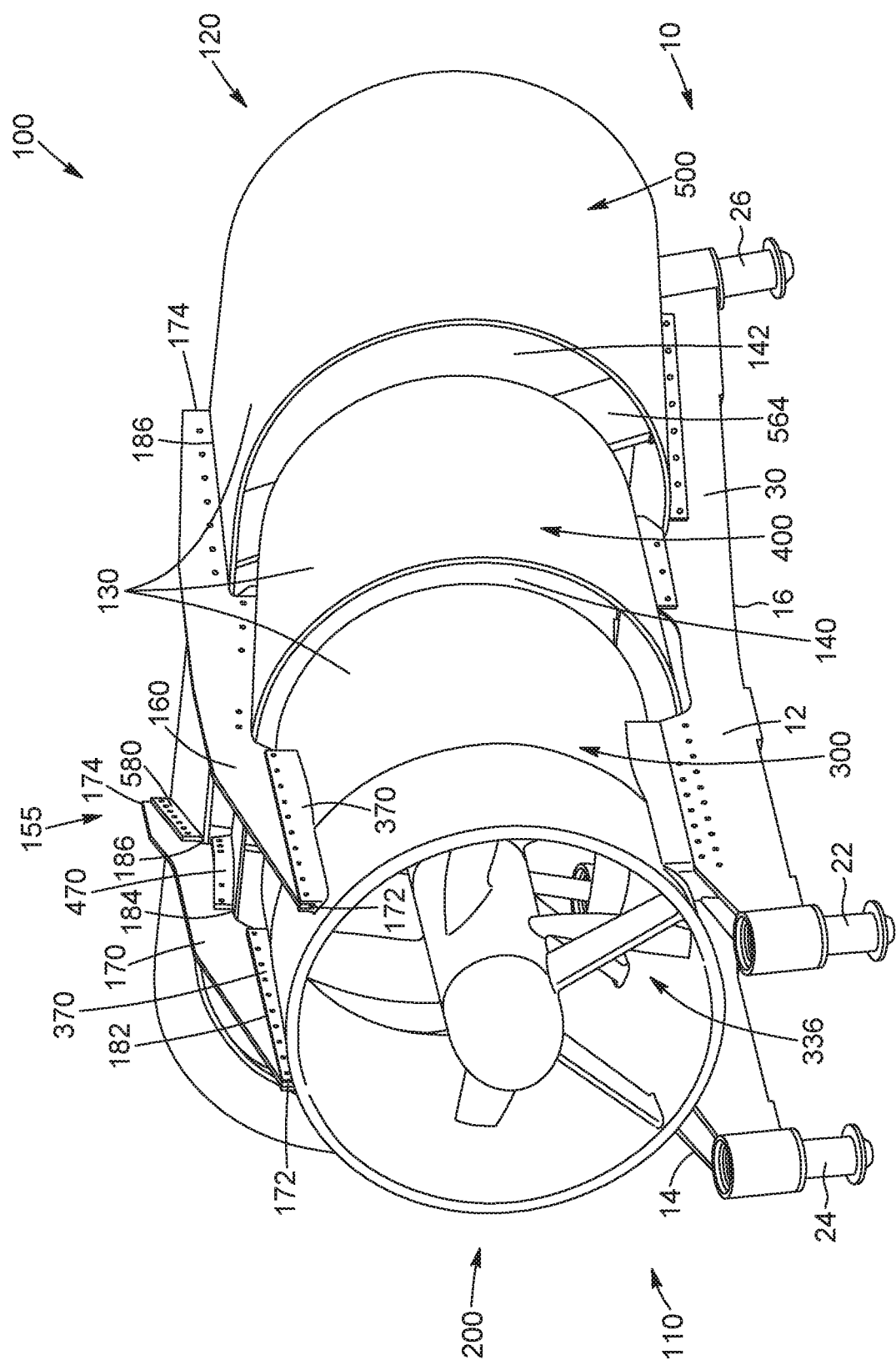
FIG. 2 is an isometric side perspective view of the multi-staged cowl of FIG. 1.

The multi-staged cowl described herein allows to increase water flow and pressure drop at the runner cross-section of a hydrokinetic turbine so as to maximize the power output produced, while respecting dimensional constraints provided by a shallow body of water, a river for example, in which the hydrokinetic turbine can be submerged. The multi-staged cowl described herein can thus be configured so as to allow water to flow through the hydrokinetic turbine at a substantially stable water flow.

In one implementation, the multi-staged cowl is configured to receive the hydrokinetic turbine therein, at least in part, and can include an inlet, an outlet and a plurality of stages which can extend between the inlet and the outlet, so that water can flow therethrough in a water flow direction. The hydrokinetic turbine can include a rotor, a hub and blades, which can radially extend therefrom, forming the runner cross-section. The hub can extend at least partially in the flow direction so that the power output can be maximized. The multi-staged cowl defines a height which allows the stages (and the turbine) to be fully submerged into the body of water. For example, the height of the multi-staged cowl can remain substantially constant along its length, or along the water flow direction, so that the multi-staged cowl and hydrokinetic turbine arrangement can be operational in the shallow river. Moreover, the stages, or some of the stages, can have widths which can increase along their lengths (or a segment thereof), so that a substantially stable water flow can flow therethrough, and more particularly, at the runner cross-section of the hydrokinetic turbine. This configuration of the multi-staged cowl can thus allow to avoid fluid separation when water flows through the stages to negligible levels, and can minimize vortices creation about the hydrokinetic turbine to negligible levels. Significant water flow and pressure drop can therefore be created at the runner cross-section of the turbine.

In one implementation, the multi-staged cowl can include a plurality of draft tubes, two or more for example, which can be configured so as to permit water to flow therethrough in the water flow direction. In one scenario, the multi-staged cowl can include inlet and outlet draft tubes. The multi-staged cowl can optionally be a three-stage cowl and include an intermediate draft tube, downstream from the inner draft tube, and upstream from the outlet draft tube. For example, the hub and blades of the hydrokinetic turbine can be received in the inner draft tube, at least in part. As it will be described in more details below, each draft tube has an inlet, as well as an outlet, which can be received in an inlet of a corresponding downstream draft tube. For example, the outlet of the inner draft tube can be configured so as to be received in the inlet of the intermediate draft tube, and similarly, the outlet of the intermediate draft tube can be configured so as to be received in the inlet of the outlet draft tube, so that the multi-stage cowl can further include a first water passage at the inlet of the intermediate draft tube, as well as a second water passage at the inlet of the outlet draft tube. In one scenario, the first water passage can be provided between the outer surface of the inlet draft tube and the inner surface of the intermediate draft tube, in periphery of the inner draft tube for example, while the second water passage can be provided between the outer surface of the intermediate draft tube and the inner surface of the outlet draft tube, in periphery of the intermediate draft tube for example. The first and second water passages can thus allow water that has not been supplied to the runner cross-section of the hydrokinetic turbine to flow therethrough so as to be combined with the water that flows through the multi-staged cowl, in the water flow direction, for example. Such feature of the cowl can allow for a stable water flow through the draft tubes, and thus, for a stable and increased water flow at the runner cross-section of the turbine. Since the multi-staged cowl can have the ability to maintain a quasi-laminar flow about the inner surfaces of the inlet draft tube, thanks to the increasing widths of the draft tubes, primarily 400 and 500, as well as through the first and second water passages, an effective vortices-free and separation-free flow can be maintained through the draft tubes, and more importantly, at the runner cross-section of the turbine, while the cowl can have a length that can be operatively and economically viable. The cavitation volume can also be minimized at the runner cross-section of the turbine.

Referring now to the drawings, and more particularly to the implementation of FIGS. 1 to 8, there is provided a multi-staged cowl (100) which is configured to receive a hydrokinetic turbine (200) therein. The multi-staged cowl (100) can be configured so that it can be fully submerged in the body of water, in arrangement with the turbine (200). For example, the multi-staged cowl (100) can be secured to the bed of the body of water. The hydrokinetic turbine (200) can include an intake nose (210), an outer rotor forming a hub (220), an inner stator inside the rotor and blades (230, 232, 234, 236), which can extend radially therefrom, so as to form the runner cross-section. It is noted that the hydrokinetic turbine (200) can take any shape, size or configuration, as long as it can be introduced into the multi-staged cowl (100), at least in part, so that water which flows downstream from the runner cross-section can flow through at least part of the cowl (100). Thus, the shape, size or configuration of the hub (220), as well as the shape, size or configuration of the intake nose (210), size and configuration of hub (220) and blades (230, 232, 234, 236) can vary. Additionally, even though the hydrokinetic turbine (200) is illustrated in FIGS. 1 to 4 as including four blades (230, 232, 234, 236), it is noted that the number of blades which extend from the hub (220) can vary.

Figure 4:
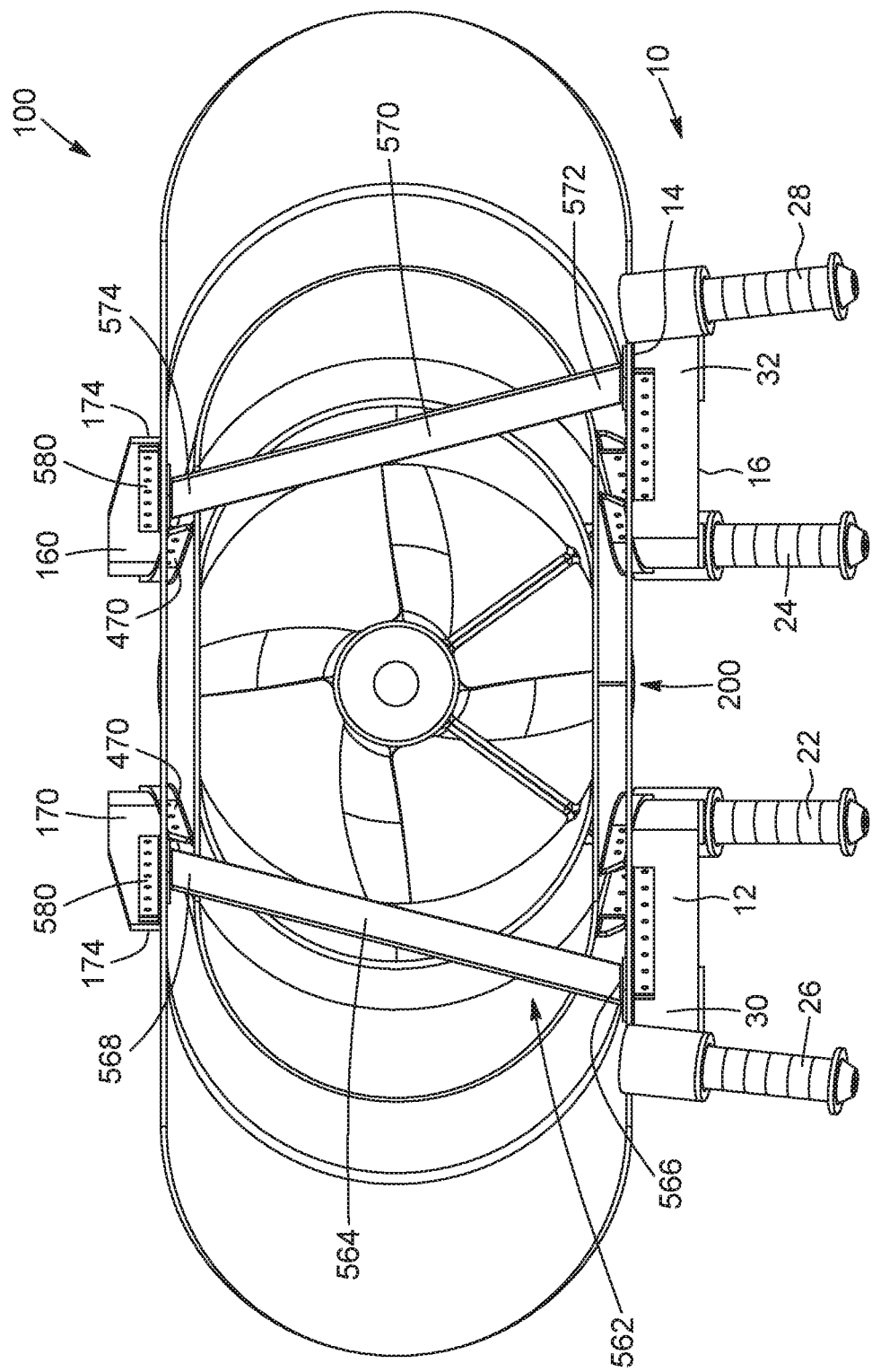
FIG. 4 is a rear elevation view of the multi-staged cowl of FIG. 1.
Figure 5:
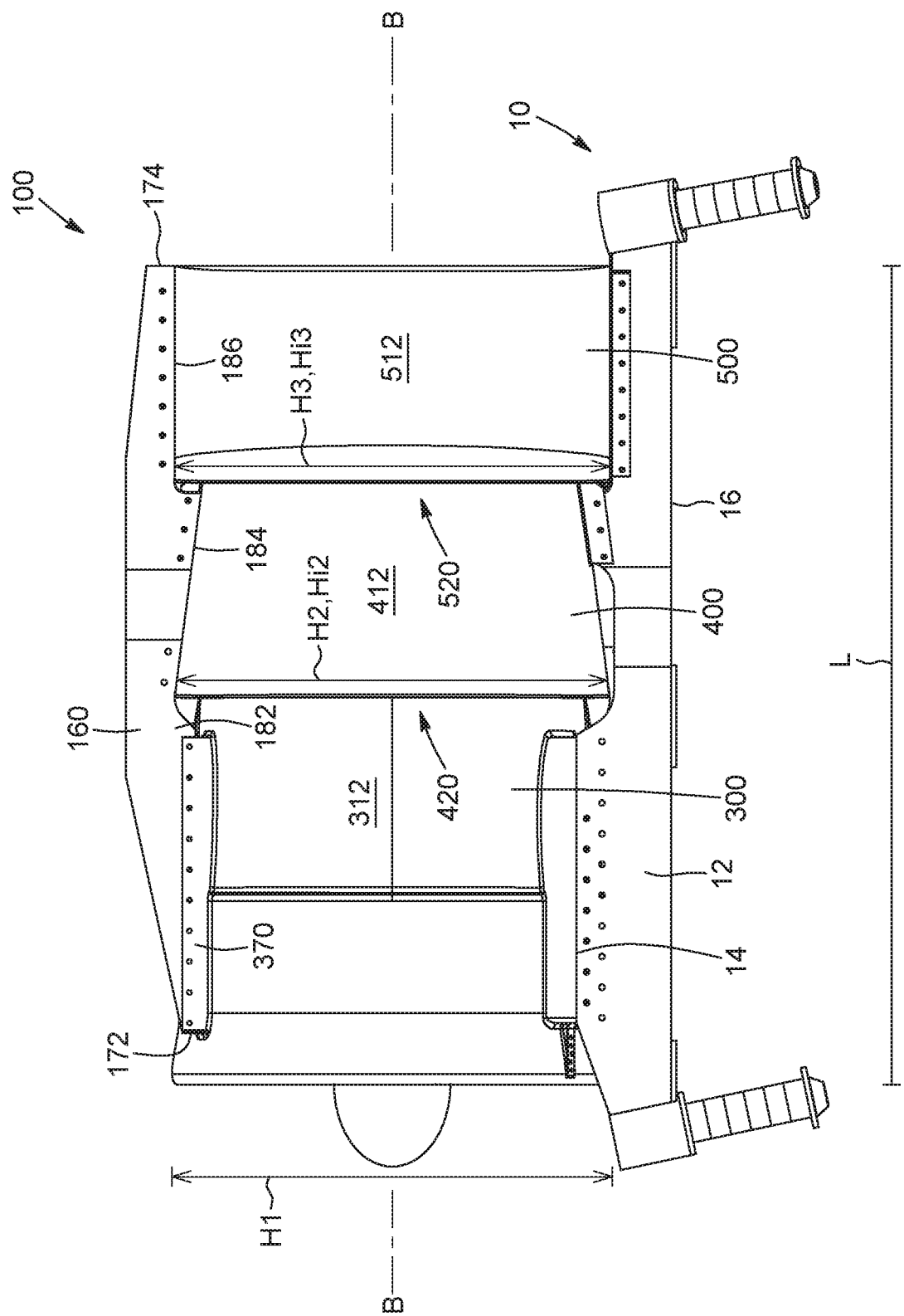
FIG. 5 is a side elevation view of the multi-staged cowl of FIG. 1.
Figure 6:
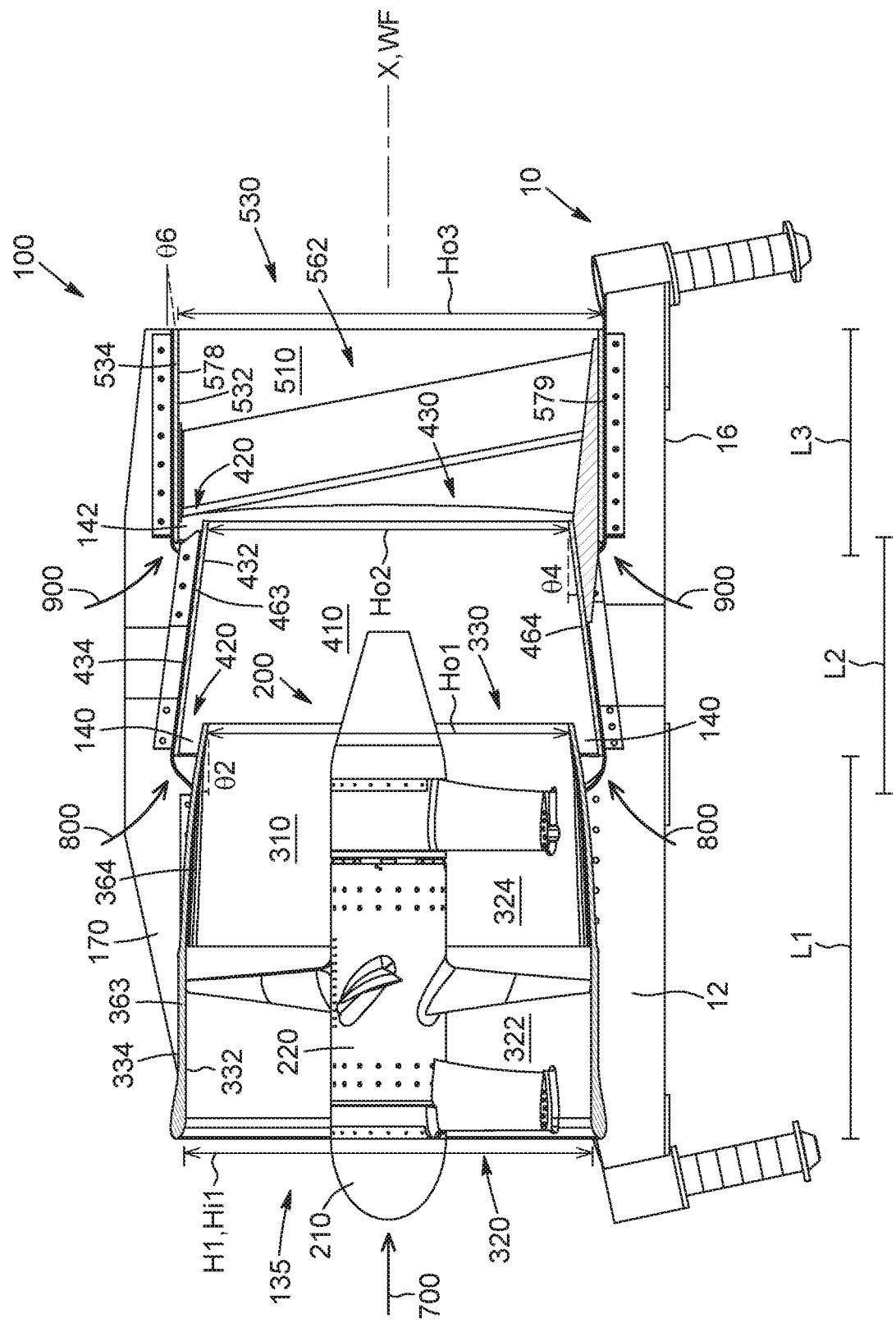
FIG. 6 is a cross-sectional view of the multi-staged cowl taken along line A-A of FIG. 7.
Figure 7:
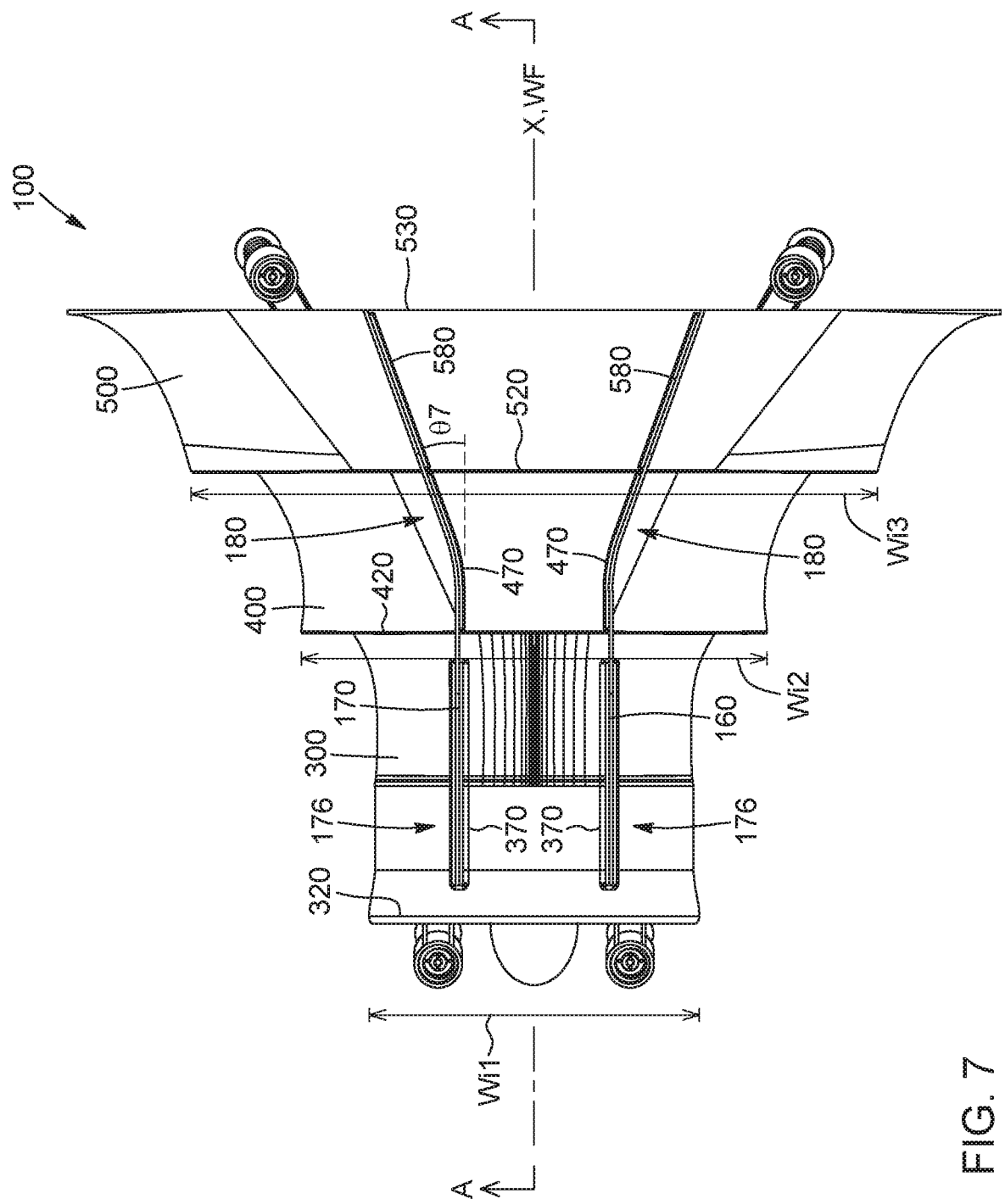
FIG. 7 is a top plan view of the multi-staged cowl of FIG. 1.
Figure 8:
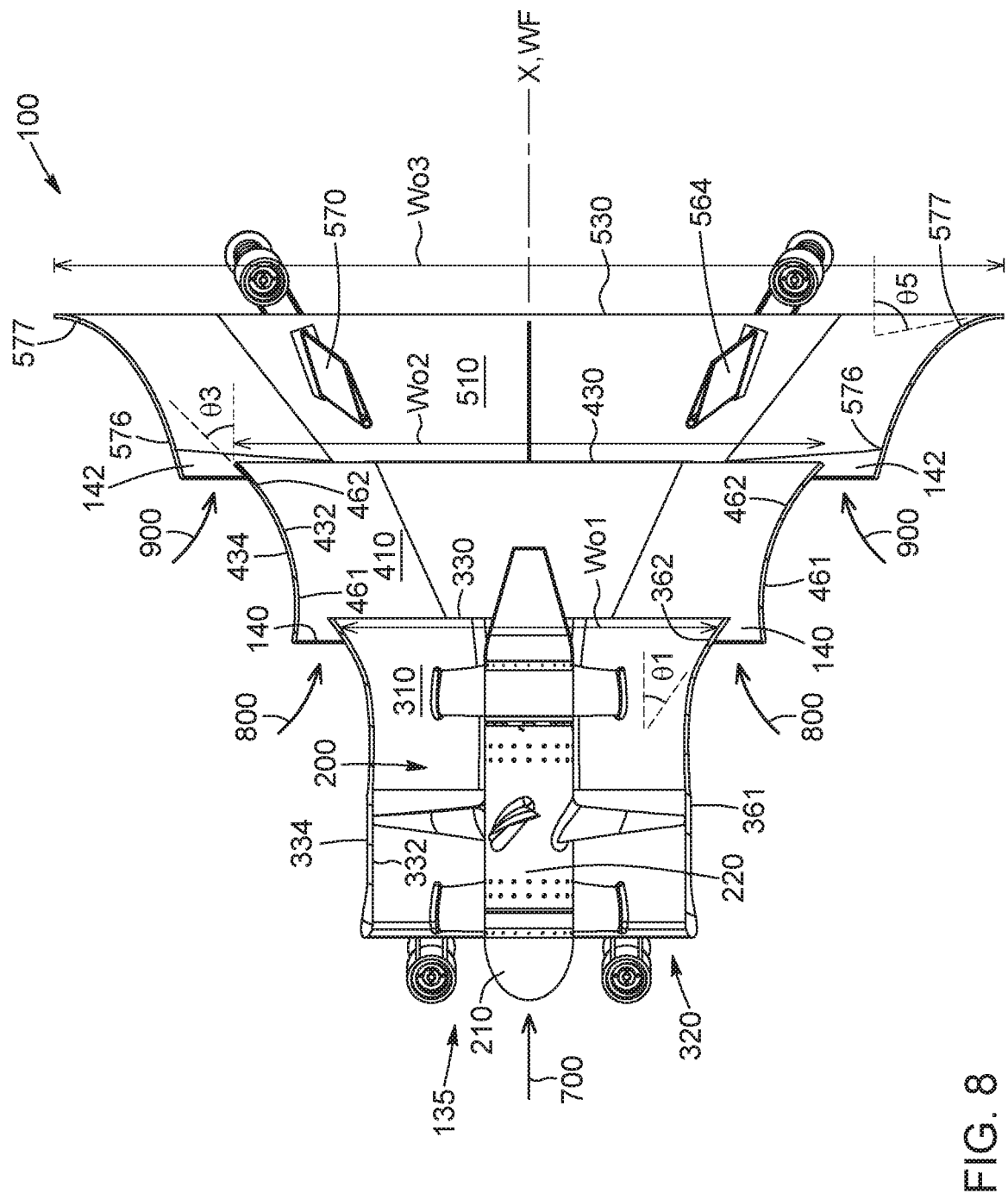
FIG. 8 is a cross-sectional view of the multi-staged cowl taken along line B-B of FIG. 5.

Still referring to the implementation of FIGS. 1 to 8, the multi-staged cowl (100) includes an inlet (110) and an outlet (120), which can be found opposite to the inlet (110). The multi-staged cowl (100) further includes a plurality of stages (130), which can extend between the inlet (110) and the outlet (120). As mentioned above, the stages (130) can be configured to receive the hydrokinetic turbine (200) therein, at least in part, so water can flow through the stages (130) from a section of the stages (130) upstream from the blades (230, 232, 234, 236) (i.e., upstream from the runner cross-section) towards a section of the stages (130) downstream from the blades (230, 232, 234, 236) (i.e., downstream from the runner cross-section) and then, through the outlet (120). The plurality of stages (130) together define a flow channel (135) which defines a water flow direction (WF). The multi-staged cowl (100) further defines a height (H) and a length (L), while the stages (130) can define a width (Wi) at the inlet (110), as well as a width (Wo) at the outlet (120) of the multi-staged cowl (100). In one implementation, the height (H) of the cowl (100) can allow the stages (130) (and the turbine (200)) to be fully submerged into the substantially shallow body of water. For example, the height (H) of the cowl (100) can be substantially constant along its length (L) (or along the water flow direction (WF)), while the width (Wo) at the outlet (120) of the cowl (100) can be greater than the width (Wi) at the inlet (110) of the cowl (100). More particularly, the width of one or more of the stage(s) (130) (or of a segment thereof) can increase along the water flow direction (WF) from its inlet towards its outlet, as it will be described in more details below. As best illustrated in FIGS. 6 and 8, the hub (220) can extend in the water flow direction (WF), so that water can flow substantially to the runner cross-section of the turbine (200), which can increase the power output therefrom.

Still referring to the implementation of FIGS. 1 to 8, the multi-staged cowl (100) can include a plurality of draft tubes, such as the draft tubes (300, 400, 500) (i.e., the stages (130)). Indeed, the multi-staged cowl (100) can include an inlet draft tube or first stage draft tube (300). The inlet draft tube (300) can include a peripheral wall (312) which defines an inlet (320), an outlet (330) and a flow channel (310) for flow of water therethrough along the water flow direction (WF)). In other words, the inlet draft tube (300) can extend along the water flow direction (WF), and the peripheral wall (312) can delimit the flow channel (310). As best shown in FIGS. 6 and 8, water (water stream 700) can thus flow through the flow channel (310) formed by the peripheral wall (312), from the inlet (320), through an upstream section (322) of the inlet draft tube (300) (i.e., upstream from the blades (230, 232, 234, 236) or runner cross-section), through a downstream section (324) of the inlet draft tube (300) (i.e., downstream from the blades (230, 232, 234, 236) or runner cross-section), and then through the outlet (330). The peripheral wall (312) of the inlet draft tube (300) includes an inner surface (332), as well as an outer surface (334), opposite the inner surface (332). The inlet draft tube (300) defines an overall height (H1), a length (L1), a width (Wi1) at the inlet (320), a width (Wo1) at the outlet (330), a height (Hi1) at the inlet (320), as well as a height (Ho1) at the outlet (330). In one implementation, the inlet draft tube (300) can define a height (H1) so it can be fully submerged into the shallow body of water. More particularly, the inlet draft tube (300) can define a height (H1) which can be substantially constant along its length (L1) (or along the water flow direction (WF)). In other words, the height (Hi1) at the inlet (320) can substantially correspond to the height (Ho1) at the outlet (330). However, it is noted that the width (Wo1) at the outlet (330) can be greater than the width (Wi1) at the inlet (320). For example, the width of the inlet draft tube (300) can increase along its length (L1) from the inlet (320) towards the outlet (330), or alternatively, along a segment of its length (L1). It is however noted that the width (Wi1) at the inlet (320) can substantially correspond to the width (Wo1) at the outlet (330), or alternatively, the width of the inlet draft tube (300) can remain substantially constant along its length (L1). In one implementation, the height of the inlet draft tube (300) can increase or decrease along its length (L1) following a hydraulic profile designed and optimized to stabilize the flow across the turbine runner, remove flow oscillation and fluid separation across the turbine runner, while the width of the outlet draft tube (500) can increase along a segment of its length (L1) following another hydraulic profile designed and optimized to stabilize the flow in the inlet draft tube (300), the intermediate draft tube (400) and the outlet draft tube (500) and at the same time remove oscillation and fluid separation across the turbine runner.

Still referring to the implementation of FIGS. 1 to 8, the multi-stage cowl (100) can further include a hub supporting structure (336) which can be configured to support the hub (220) of the turbine (200) along the axis (X), so it can extend in the water flow direction (WF) once the cowl (100) and turbine (200) arrangement has been submerged into the body of water. The hub supporting structure (336) can include the hub supporting members (338, 344, 350, 356) which can extend between the inner surface (332) of the inlet draft tube (300) and a static portion (i.e., the inner stator) of the hub (220). In one implementation, and as best shown in FIG. 1, the hub supporting member (338) can extend between a right and lower section of the inner surface (332) at the inlet (320) and a right and front section of a lower portion of the hub (220). The hub supporting member (344) can extend between a left and lower section of the inner surface (332) at the inlet (320) and a left and front section of the lower portion of the hub (220). The hub supporting member (350) can extend between a right and lower section of the inner surface (332) at the outlet (330) and a right and rear section of the lower portion of the hub (220). Finally, the hub supporting member (356) can extend between a left and lower section of the inner surface (332) at the outlet (330) and a left and rear section of the lower portion of the hub (220). In one scenario, the hub supporting members (338, 344, 350, 356) can be at an angle tilting inwards towards the central axis (X) (i.e., towards the center of the inlet draft tube (300)). As shown, draft tube ends (340, 346, 352, 358) can be secured to the lower section of the inner surface (332), while hub ends (342, 348, 354, 360) can be secured to the static sections of the hub (220). The ends (340, 346, 352, 358) and the ends (342, 348, 354, 360) of the hub supporting members (338, 344, 350, 356) can be secured to the inlet draft tube (300) and the hub (220) using suitable mechanical fasteners. Alternatively, the ends (340, 346, 352, 358) and the ends (342, 348, 354, 360) of the hub supporting members (338, 344, 350, 356) can be secured to the inlet draft tube (300) and the hub (220) using either fasteners or other known techniques (e.g., by welding). It is further noted that the hub supporting structure (336) can take any shape, size or configuration, as long as it can support the turbine (200) with its hub (220) being extending in the water flow direction (WF), at least in part, and as long as water can flow through the inlet draft tube (300) with as little longitudinal obstructions as possible, so water flow can be enhanced through the cowl (100). For example, in one implementation, the hub supporting structure (336) can be hydraulically profiled along the water flow direction (WF). In another scenario (not shown), a hub supporting structure can extend from the riverbed for example, so that water can flow through the inlet draft tube (300) without being obstructed by components such as the hub supporting members (338, 344, 350, 356). The hub supporting structure (336) can further include a passage configured to receive the electric submarine cable to evacuate the electrical power generated by the turbine's electrical generator (not shown) inside the turbine hub (220) and other electric wires including a fiber optic (not shown) extending from the hydrokinetic turbine (200).

Figure 3:
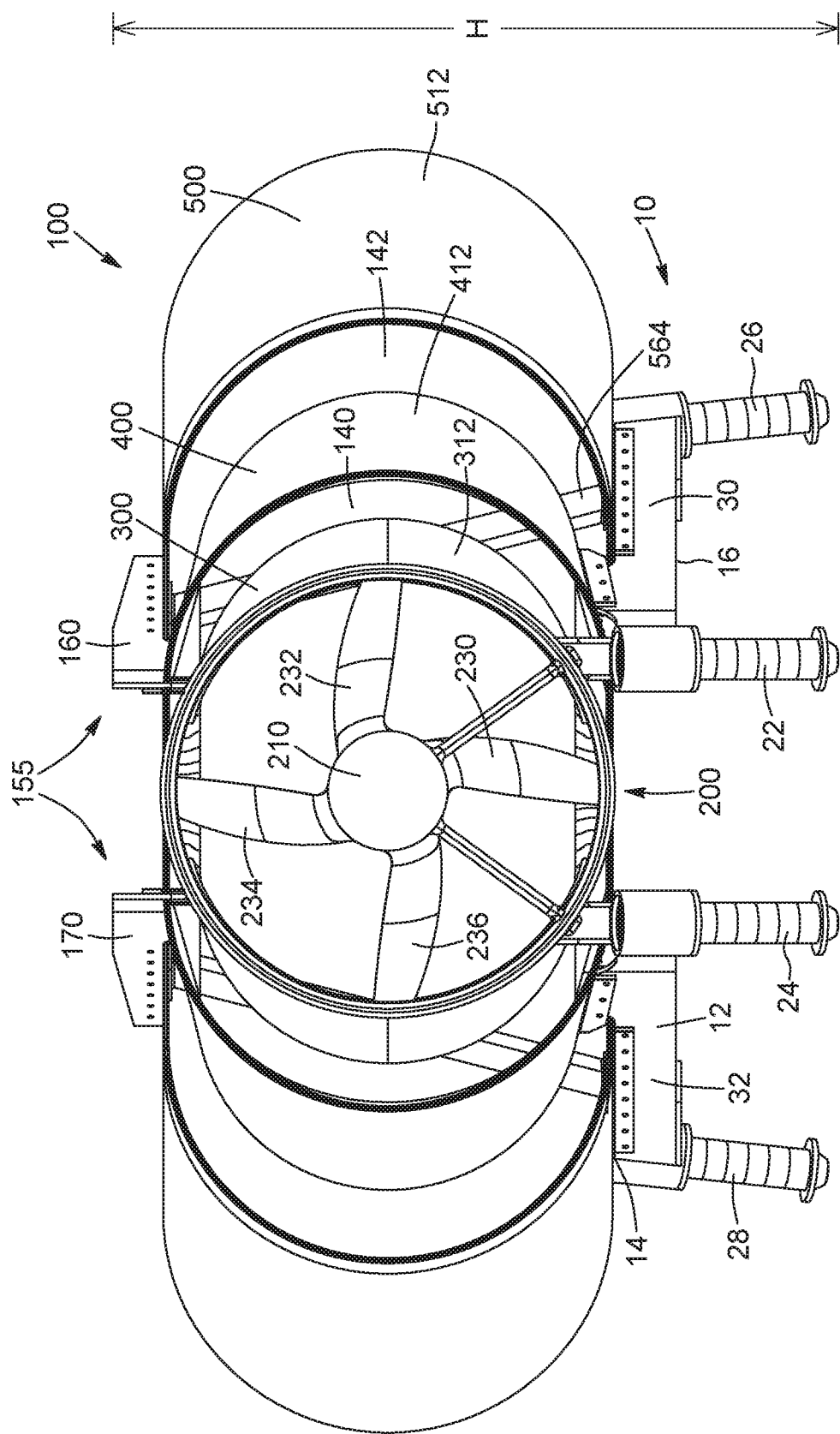
FIG. 3 is a front elevation view of the multi-staged cowl of FIG. 1.

Still referring to the implementation of FIGS. 1 to 8, the multi-staged cowl (100) can further include an intermediate draft tube or second stage draft tube (400), which can be located downstream from the inlet draft tube (300). The intermediate draft tube (400) can include a peripheral wall (412), which defines an inlet (420), an outlet (430) and a flow channel (410) for flow of water therethrough along the water flow direction (WF)). In other words, the intermediate draft tube (400) can extend along the water flow direction (WF), and the peripheral wall (412) can delimit the flow channel (410). As best shown in FIGS. 6 and 8, water (water stream 700) can thus flow through the flow channel (410) formed by the peripheral wall (412), from the outlet (330) of the inlet draft tube (300) towards the outlet (430) of the intermediate draft tube (400). The intermediate draft tube (400) also has an inner surface (432), as well as an outer surface (434), opposite the inner surface (432). The intermediate draft tube (400) defines a height (H2), a length (L2), a width (Wi2) at the inlet (420), a width (Wo2) at the outlet (430), a height (Hi2) at the inlet (420), as well as a height (Ho2) at the outlet (430). In one implementation, the intermediate draft tube (400) can define a height (H2) so it can be fully submerged into the shallow body of water. More particularly, the intermediate draft tube (400) can define a height (H2) which can be substantially constant along its length (L2) (or along the water flow direction (WF)). For example, the height (Hi2) at the inlet (420) can substantially correspond to the height (Ho2) at the outlet (430) of the intermediate draft tube (400). As best shown in FIGS. 5 and 6, the height (Hi2) at the inlet (420) can be slightly greater than the height (Ho2) at the outlet (430). More particularly, the height (H2) of the intermediate draft tube or second stage draft tube (400) can decrease along its length (L2) (or along the water flow direction (WF)), from the inlet (420) towards the outlet (430), or alternatively, along a segment of the length (L2). Other configurations of the intermediate draft tube (400) are possible. However, and as best illustrated in FIGS. 7 and 8, it is noted that the width (Wo2) at the outlet (430) can be greater than the width (Wi2) at the inlet (420). More particularly, the width of the intermediate draft tube (400) can increase along its length (L2) (or along the water flow direction (WF)) from the inlet (420) towards the outlet (430), or alternatively, along a segment of its length (L2). In one implementation, the height of the intermediate draft tube (400) can increase or decrease along its length (L2) following a hydraulic profile designed and optimized to stabilize the flow and avoid fluid separation inside the draft tubes (300, 400, 500), while the width of the intermediate draft tube (400) can increase along its length (L2) following another hydraulic profile designed and optimized to stabilize the flow and avoid fluid separation inside the draft tubes (300, 400, 500) and at the runner cross section.

Still referring to the implementation of FIGS. 1 to 8, the multi-staged cowl (100) can also include an outlet draft tube or third stage draft tube (500), which can be located downstream from the intermediate draft tube (400). The outlet draft tube (500) can include a peripheral wall (512), which defines an inlet (520), an outlet (530) and a flow channel (510) for flow of water therethrough along the water flow direction (WF)). In other words, the outlet draft tube (500) can extend along the water flow direction (WF) and the peripheral wall (512) can delimit the flow channel (510). As best shown in FIGS. 6 and 8, water (water stream 700) can thus flow through the flow channel (510) formed by the peripheral wall (512), from the outlet (430) of the intermediate draft tube (400) towards the outlet (530) of the outlet draft tube (500). The outlet draft tube (500) also includes an inner surface (532), as well as an outer surface (534), opposite the inner surface (532). The outlet draft tube (500) defines a height (H3), a length (L3), a width (Wi3) at the inlet (520), a width (Wo3) at the outlet (530), a height (Hi3) at the inlet (520), as well as a height (Ho3) at the outlet (530). In one implementation, and as best shown in FIGS. 5 and 6, the outlet draft tube (500) can define a height (H3) so it can be fully submerged into the shallow body of water height. More particularly, the height (H3) can be substantially constant along its length (L3) (or along the water flow direction (WF)). For example, the height (Hi3) at the inlet (520) can substantially correspond to the height (Ho3) at the outlet (530) of the outlet draft tube (500). Referring particularly to FIGS. 5 and 6, the height (Ho3) at the outlet (530) can be slightly greater than the height (Hi3) at the inlet (520). More particularly, the height of the outlet draft tube (500) can increase along its length (L3) (or along the water flow direction (WF)) from the inlet (520) towards the outlet (530) of the outlet draft tube (500), or along a section of the length (L3). Other configurations of the outlet draft tube (500) are possible. Nonetheless, as best illustrated in FIGS. 7 and 8, it is noted that the width (Wo3) at the outlet (530) can be greater than the width (Wi3) at the inlet (520). More particularly, the width of the outlet draft tube (500) can increase along its length (L3) (or along the water flow direction (WF)) from the inlet (520) towards the outlet (530) of the outlet draft tube (500), or alternatively, along a segment of its length (L3). In one implementation, the height of the outlet draft tube (500) can increase or decrease along its length (L3) following a hydraulic profile designed and optimized to stabilize the flow and avoid fluid separation inside the draft tubes (300, 400, 500) and at the runner cross section to negligible levels, while the width of the outlet draft tube (500) can increase along its length (L3) following another hydraulic profile designed and optimized to stabilize the flow and avoid fluid separation inside the draft tubes (300, 400 and 500) and at the runner cross section to negligible levels.

Referring now more particularly to FIGS. 6 and 8, in one implementation, the inlet draft tube (300) can be at least partially engaged in the flow channel (410) of the intermediate draft tube (400), while the intermediate draft tube (400) can be at least partially engaged in the flow channel (520) of the outlet draft tube (500). Indeed, the outlet (330) of the inlet draft tube (300) can be received in the inlet (420) of the intermediate draft tube (400), while the outlet (430) of the intermediate draft tube (400) can be received in the inlet (520) of the outlet draft tube (500) so that the multi-stage cowl (100) can further include a first water passage (140) at the inlet (420) of the intermediate draft tube (400), as well as a second water passage (142) at the inlet (520) of the outlet draft tube (500). In one implementation, the first water passage (140) can be provided in periphery of the outlet (320) of the inlet draft tube (300), so that water (water stream (800)) can flow through the passage formed between the outer surface (334) of the inlet draft tube (300) at the outlet (330) thereof, and the inner surface (432) of the intermediate draft tube (400) at the inlet (420) thereof. On the other hand, the second water passage (142) can be provided in periphery of the outlet (430) of the intermediate draft tube (400), so that water (water stream (900)) can flow through the passage formed between the outer surface (434) of the intermediate draft tube (400) at the outlet (430) thereof, and the inner surface (532) of the outlet draft tube (500) at the inlet (520) thereof. Thus, in one scenario, the height (Hi2) at the inlet (420) can be greater than the height (Ho1) at the outlet (330) and the height (Hi3) at the inlet (520) can be greater than the height (Ho2) at the outlet (430), while the width (Wi2) at the inlet (420) can be greater than the width (Wo1) at the outlet (330) and the width (Wi3) at the inlet (520) can be greater than the width (Wo2) at the outlet (430). Other configurations of the drat tubes (300, 400, 500) are possible, as long as water can flow through the inlets (420, 520) of the draft tubes (400, 500).

Referring now more particularly to FIG. 8, it is noted that the inlet draft tube (300) can include substantially straight portions (361) (i.e., left and right substantially straight portions (361)), and diverging wall portions (362) (i.e., left and right diverging wall portions (362)), about the outlet (330), which can extend from the straight portions (361) (or water flow direction (WF)) at a divergence angle (01). For example, the divergence angle (01) can be between about 2° and about 60°, between about 10° and about 40°, or between about 25° and about 35°. For example, the width of the inlet draft tube (300) can increase along a segment of its length (L1) following a hydraulic profile designed and optimized to stabilize the flow and avoid fluid separation inside the draft tubes (300, 400, 500) and at the runner cross section to negligible levels. It is however noted that in another scenario, the width of the inlet draft tube (300) can increase along a segment of its length (L1) following a hydraulic profile designed and optimized to stabilize the flow and avoid fluid separation inside the draft tubes (300, 400, 500) and at the runner cross section to negligible levels. It is further noted that the peripheral wall (312) can take any shape, size or configuration, as long as the width of the inlet draft tube (300) can increase along at least a segment of its length (L1). For example, that segment can be found about outlet (330), adjacent to the first water passage 140.

Referring now more particularly to FIG. 6, it is noted that the inlet draft tube (300) can include substantially straight portions (363) (i.e., upper and lower substantially straight portions (363)), and converging wall portions (364) (i.e., upper and lower converging wall portions (364)), between the runner cross-section and the outlet (330) for example, which can extend from the straight portions (363) at a convergence angle (02). For example, the convergence angle (02) can be between about 1° and about 20°, between about 5° and about 15°, or between about 8° and about 12°. For example, the converging wall portions (364) can have an hydraulic profile designed and optimized to stabilize the flow and avoid fluid separation inside the draft tubes (300, 400, 500) and at the runner cross section to negligible levels. Thus, the height of the inlet draft tube (300) can decrease along a segment of its length (L1) following a hydraulic profile designed and optimized to stabilize the flow and avoid fluid separation inside the draft tubes (300, 400 and 500) and at the runner cross section to negligible levels. It is however noted that in another scenario, the height of the inlet draft tube (300) can increase along a segment of its length (L1) following a hydraulic profile designed and optimized to stabilize the flow and avoid fluid separation inside the draft tubes (300, 400, 500) and at the runner cross section to negligible levels. It is further noted that the peripheral wall (312) can take any shape, size or configuration, as long as the height of the inlet draft tube (300) can allow the cowl (100) to be fully submerged into the body of water, and as long as the outlet (330) can be received in the inlet (420) so as to form the water passage (140).

Referring now more particularly to FIG. 8, it is noted that the intermediate draft tube (400) can include inlet portions (461) (i.e., left and right inlet portions (461)), about the inlet (420), as well as outlet portions (462) (i.e., left and right outlet portions (462)), about the outlet (430). For example, the outlet portions (462) can extend from the water flow direction (WF) or axis (X) at a divergence angle (03). In some implementations, the divergence angle (03) can be between about 8° and about 90°, between about 10° and about 60°, or between about 45° and about 55°. For example, the outlet portions (462) can have a hydraulic profile designed and optimized to stabilize the flow and avoid fluid separation inside the draft tubes (300, 400, 500) and at the runner cross section. Thus, as mentioned above, the width of the intermediate draft tube (400) can increase along its length (L2), or a segment of its length (L2), following a hydraulic profile designed and optimized to stabilize the flow and avoid fluid separation inside the draft tubes (300, 400, 500) and at the runner cross section to negligible levels. It is further noted that the peripheral wall (412) can take any shape, size or configuration, as long as the width of the intermediate draft tube (400) can increase along at least a segment of its length (L2). For example, that segment can be found about the outlet (430), adjacent to the second water passage 142. It is also noted that the width increasing rate of the intermediate draft tube (400) can be greater for the outlet portions (462) than for the inlet portions (461).

Referring now more particularly to FIG. 6, it is noted that the intermediate draft tube (400) can include upper and lower portions (463, 464). Each one of the upper and lower portions (463, 464) can extend from the water flow direction (WF) or axis (X) at a converging angle (04). For example, the convergence angle (04) can be between about 1° and about 20°, between about 5° and about 15°, or between about 8° and about 12°. As mentioned above, the upper and lower portions (463, 464) can have a substantially straight profile. Thus, the height of the intermediate draft tube (400)

can slightly decrease along its length (L2) following a hydraulic profile designed and optimized to stabilize the flow and avoid fluid separation inside the draft tubes (300, 400, 500) and at the runner cross section to negligible levels. It is however noted that in another scenario, the height of the intermediate draft tube (400) can increase along its length (L2), or a segment thereof, following a hydraulic profile designed and optimized to stabilize the flow and avoid fluid separation inside the draft tubes (300, 400, 500) and at the runner cross section to negligible levels. It is further noted that the peripheral wall (412) can take any shape, size or configuration, as long as the height of the intermediate draft tube (400) can allow the cowl (100) to be fully submerged into the body of water, and as long as the outlet (430) can be received in the inlet (520) so as to form the water passage (142).

Referring back to FIG. 8, it is noted that the outlet draft tube (500) can include inlet portions (576) (i.e., left and right inlet portions (576)), about the inlet (520), as well as outlet portions (577) (i.e., left and right outlet portions (577)), about the outlet (530). For example, the outlet portions (577) can extend from the water flow direction (WF) or axis (X) at a divergence angle (05). In some implementations, the divergence angle (05) can be between about 8° and about 90°, between about 10° and about 85°, or between about 60° and about 60°. For example, the outlet portions (577) can have a hydraulic profile designed and optimized to stabilize the flow and avoid fluid separation inside the draft tubes (300, 400, 500) and at the runner cross section to negligible levels. Thus, as mentioned above, the width of the outlet draft tube (500) can increase along its length (L3), or a segment of its length (L3), following a hydraulic profile designed and optimized to stabilize the flow and avoid fluid separation inside the draft tubes (300, 400, 500) and at the runner cross section to negligible levels. It is further noted that the peripheral wall (512) can take any shape, size or configuration, as long as the width of the outlet draft tube (500) can increase along at least a segment of its length (L3). For example, that segment can be found about outlet (530). It is also noted that the width increasing rate of the outlet draft tube (500) can be greater for the outlet portions (577) than for the inlet portions (576).

Referring back to FIG. 6, it is noted that the outlet draft tube (500) can include upper and lower portions (578, 579). Each one of the upper and lower portions (578, 579) can extend from the water flow direction (WF) or axis (X) at a diverging angle (06). For example, the convergence angle (06) can be between about 1° and about 85°, between about 2° and about 60°, or between about 4° and about 40°. As mentioned above, the upper and lower portions (578, 579) can have a substantially straight profile. Thus, the height of the outlet draft tube (500) can slightly increase along its length (L3) following hydraulic profile designed and optimized to stabilize the flow and avoid fluid separation inside the draft tubes (300, 400, 500) and at the runner cross section to negligible levels. It is however noted that in another scenario, the height of the outlet draft tube (500) can decrease along its length (L3) or a segment thereof, following a hydraulic profile designed and optimized to stabilize the flow and avoid fluid separation inside the draft tubes (300, 400, 500) and at the runner cross section to negligible levels. It is further noted that the peripheral wall (512) can take any shape, size or configuration, as long as the height of the outlet draft tube (500) can allow the cowl (100) to be fully submerged into the body of water. It is to be noted that the widths of the inlet, intermediate and/or outlet draft tubes (300, 400, 500) can increase along their lengths, or segment(s) thereof, following a substantially linear relationship and/or a non-linear relationship. Similarly, the heights of the inlet, intermediate and/or outlet draft tubes (300, 400, 500) can increase and/or decrease along their lengths, or segment(s) thereof, following a substantially linear relationship and/or a non-linear relationship.

Thus, as best illustrated in FIGS. 6 and 8, once the multi-staged cowl (100) and turbine (200) arrangement has been fully submerged into the body of water and the turbine (200) is in operation, water (stream (700)) can flow through the inlet (320), through the upstream section (322), through the downstream section (324), and then through the outlet (330) of the inlet draft tube (300). While the water being expelled from the outlet (330) can flow through the intermediate draft tube (400) towards the outlet (430) thereof, water that has not entered the inlet draft tube (300) (i.e., stream (800)) can flow through the first water passage (140), provided at the inlet (420) in periphery of the inlet draft tube (300), and can be combined with the water stream (700), which flows through the intermediate draft tube (400) along the water flow direction (WF). For example, water flow (800) can follow the inlet and outlet portions (461, 462) of the inner surface (432) of the peripheral wall (412). Similarly, while the water being expelled from the outlet (430) of the intermediate draft tube (400) (i.e., water streams (700, 800)) can flow through the outlet draft tube (500) towards the outlet (530), water that has not entered the inlet or intermediate draft tubes (300, 400) (stream (900)) can flow through the second water passage (142), provided at the inlet (520) in periphery of the intermediate draft tube (400), and can be combined with the water stream (700, 800), which flows through the outlet draft tube (500) along the water flow direction (WF). For example, water flow (900) can follow the inlet and outlet portions (576, 577) of the inner surface (532) of the peripheral wall (512).

The multi-staged cowl (100) described herein thus allows to increase water flow and pressure drop at the runner cross-section of the turbine (200) so as to maximize the produced power output, while respecting dimensional constraints provided by the shallow body of water, the river for example, in which the turbine (200) is submerged. The multi-staged effect provided by the multi-staged cowl (100) (in periphery of outlets (330, 430)) can thus allow water to flow through the turbine (200) at a substantially stable water flow, away from oscillation, with negligible vortices and fluid separation. The height (H) of the multi-staged cowl (100) can remain substantially constant along its length (L), or along the water flow direction (WF), so that the multi-staged cowl (100) and turbine (200) arrangement can be operational in the shallow river. The draft tubes (300, 400, 500) have widths which can increase along at least a segment of their lengths (L1, L2, L3), so that an optimized water mass flow can flow therethrough, and more particularly, at the runner cross-section of the turbine (200). This configuration of the multi-staged cowl (100) can thus allow to avoid fluid separation when water flows through the draft tubes (300, 400, 500), and prevent vortices creation about the turbine (200) to negligible levels. Significant water flow and pressure drop can therefore be created at the runner cross-section of the turbine (200). The water passages (140, 142) further allow water that has not been supplied to the runner cross-section of the turbine (200) to be combined with the water that flows through the draft tubes (400, 500). Such features of the cowl (100) can allow for a stable water flow through the draft tubes (300, 400, 500), and thus, for a stable and increased water flow at the runner cross-section of the turbine (200), increasing the power output thereof. Since the multi-staged cowl (100) can have the ability to maintain a quasi-laminar flow about the inner surfaces (432, 532) of the draft tubes (400, 500), thanks to the increasing widths along their lengths (L2, L3), as well as through the first and second water passages (140, 142), an effective vortices-free and separation-free flow can be maintained through the draft tubes (300, 400, 500), and thus, at the runner cross-section of the turbine (200), while the cowl (100) can have a length (L) that can be operatively and economically viable. The cavitation volume has been minimized by design at the runner cross-section of the turbine (200) to negligible levels.

The configuration of the multi-staged cowl (100), with its different stages (130) (e.g., inlet, intermediate and outlet draft tubes (300, 400, 500)) provides for the widest lateral reach that does not exist in the art for such a short length of the optimized multi-staged cowl (100), which can allow to create that significant pressure drop and water flow rate at the runner cross-section of the turbine (200). While having aggressive lateral gradient openings, particularly in the intermediate and outlet draft tubes (400, 500), the first and second water passages (140, 142) formed at the inlets (420, 520) can help in obtaining the substantially stable mass flow at the runner cross-section of the turbine (200) by preventing vortices creations and eliminating fluid separation to negligible levels. Water which flows through the multi-staged cowl (100) can thus be substantially separation-free and vortices-free, thanks to the high velocity water flows that are created adjacent to the inner and outer surfaces (432, 434) of the intermediate draft tube (400), and to the high velocity water flows that are created adjacent to the inner and outer surfaces (532, 534) of the outlet draft tube (500). A substantially stable water flow can thus circulate through the draft tubes (300, 400, 500) (and turbine (200)), while a turbulent unsteady water can flow at the inlet (110) of the multi-staged cowl (100). Moreover, the cowl (100) can increase the decompression at the outlet (120) and can limit cavitation within the flow channels (310, 410, 510) as well as at the tip of the blades (230, 232, 234, 236) to negligible levels.

Referring back to the implementation of FIGS. 1 to 8, the multi-staged cowl (100) can optionally include a base (10) for supporting stages (130) (e.g., the draft tubes (300, 400, 500)) thereon and above the bed of the water course. The base (10) can include a main frame (12), which can define a draft tubes receiving surface (14), a ground facing surface (16), and sidewalls (30, 32). The base (10) can further include a plurality of supporting legs (22, 24, 26, 28), which can extend downwardly from the main frame (12), so that the base (10) can be opened along the water flow direction (WF) (i.e., water can also circulate underneath the stages (130) along the overall length (L) of the cowl (100)). This opened configuration of the base (10) allows water to flow all around the draft tubes (300, 400, 500). Allowing the water to flow in the water direction underneath the draft tubes (300, 400, 500) along the length (L) of the cowl (100), in between the left and right supporting legs (22, 24, 26, 28) for example, can have an important effect on the overall water flow through the turbine (200), as a lack of flow through the bottom of the turbine (200) can actually create less negative pressure fields at the outlet (120) of the cowl (100), and thus, at the outlet of the turbine (200), reducing the power output thereof. This opened configuration of the base (10) can thus allow those negative fields at the outlets (430, 530) of draft tubes (400, 500) to be created.

It is noted that the base (10) can take any shape, size or configuration, as long as it can support the stages (130) (e.g., the draft tubes (300, 400, 500)) above the bed of the water course and causes the least pressure drop for the underneath flow. In one scenario, the base (10) can be designed so as to provide as little longitudinal obstruction as possible to the water which flows underneath the draft tubes (300, 400, 500) in the water flow direction (WF). For example, the supporting legs (22, 24, 26, 28) can be hydraulically profiled along the water flow direction (WF).

Moreover, in one implementation, the supporting legs (22, 24, 26, 28) can be independently adjustable so that the base (10), and thus the draft tubes (300, 400, 500), can be levelled at appropriate 3-axis positions, in a way to maximize turbine power output. By providing the supporting legs (22, 24, 26, 28) with adjustable-legs type of mechanisms, once the turbine (200) and cowl (100) arrangement has been lowered to its desired position and orientation, the locking mechanism can be released, and can allow to lock the turbine (200) and cowl (100) arrangement in the optimum position relative to the bed of the water course. Given that sometimes strong current present in rivers, as well as depth and unevenness of the river bed, installing conventional turbines can rather be labor intensive, and can require specialized skills. Indeed, experienced divers can be required, which can be very expensive and risky. These adjustable-legs type of mechanisms can overcome those drawbacks.

Referring back to FIGS. 1, 4, 6 and 8, in one implementation, the multi-staged cowl (100) can optionally include a reinforcement structure (562) for enhancing flow stability and/or providing structural stability to the multi-staged cowl (100), and more particularly, to the outlet or third stage draft tube (500). For example, the reinforcement structure (562) can also help in preventing water flow oscillations. The reinforcement structure (562) can include spaced apart struts (564, 570) which can extend between lower and upper portions of the inner surface (532). As best shown in FIG. 1, the strut (564) can extend between a right side and lower portion of the inner surface (532) and a right side and upper portion of the inner surface (532) of the outlet draft tube (500) between the inlet and outlet (520, 530) thereof. On the other hand, the strut (570) can extend between a left side and lower portion of the inner surface (532) and a left side and upper portion of the inner surface (532) of the outlet draft tube (500) between the inlet and outlet (520, 530) thereof. For example, the strut lower ends (566, 572) can be secured to the lower portion of the inner surface (532), while the strut upper ends (568, 574) can be secured to the upper portion of the inner surface (532) of the outlet draft tube (500). In one scenario, the struts (564, 570) can be at an angle tilting inwards towards the central axis (X) (i.e., towards the center of the outlet draft tube (500)). The strut lower ends (566, 572) and the strut upper ends (568, 574) of the struts (564, 570) can be secured to the lower and upper portions of the inner surface (532) of the outlet draft tube (500) using any suitable mechanical fasteners. Alternatively, the strut lower ends (566, 572) and the strut upper ends (568, 574) of the struts (564, 570) can be secured to the outlet draft tube (500) using other known techniques (e.g., by welding). It is also noted that the struts (564, 570) can be integrally formed with the peripheral wall (512). It is further noted that the reinforcement structure (562) can take any shape, size or configuration, as long as it can structurally reinforce the cowl (100) and/or help in the enhancement of the water flow stability, at least in part, and as long as water can flow through the outlet draft tube (500) with as little longitudinal obstructions as possible, so water flow can be enhanced through the multi-staged cowl (100). For example, in one implementation, the reinforcement structure (562) can be hydraulically profiled along the water flow direction (WF).

It is further noted that, instead of being provided on the outlet draft tube (500), the reinforcement structure (562) can be coupled to the inlet draft tube (300) and/or to the intermediate draft tube (400). Finally, it is noted that the struts (564, 570) can be configured so as to avoid flow resonance and cut certain turbulent flow induced frequencies in the draft tube (500).

Still referring to the implementation of FIGS. 1 to 8, the multi-staged cowl (100) can optionally include a reinforcement structure (155), which can upwardly extend from the stages, along the length (L) of the multi-staged cowl (100), or alternatively, along a segment of the length (L). In one scenario, the reinforcement structure (155) can include spaced apart upper ribs (160, 170). Beside from providing structural stability to the multi-staged cowl (100) by connecting the draft tubes (300, 400, 500) together, the ribs (160, 170) can further enhance water flow around them, above the flow channel (135) and therefore, through the multi-staged cowl (100) and turbine (200) at the runner cross-section thereof. The ribs (160, 170) can thus contribute to increasing the power output of the hydrokinetic turbine (200). Each rib (160, 170) can upwardly extend from the outer surfaces (334, 434, 534) of the draft tubes (300, 400, 500) between the inlet (110) and the outlet (120) of the multi-staged cowl (100). Indeed, upstream ends (172) of the ribs (160, 170) can be found about the inlet (320) of the inlet draft tube (300), while the downstream ends (174) of the ribs (160, 170) can be found about the outlet (530) of the outlet draft tube (500).

In one scenario, the inner draft tube (300) can include a connecting member (370) which can upwardly extend from the outer surface (334), the intermediate draft tube (400) can include a connecting member (470) which can upwardly extend from the outer surface (434), while the outer draft tube (500) can include a connecting member (580) which can upwardly extend from the outer surface (534). The connecting members (370, 470, 580) can be secured to the outer surfaces (334, 434, 534) of the draft tubes (300, 400, 500) using suitable mechanical fasteners or other known techniques (e.g., by welding). It is also noted that the connecting members (370, 470, 580) can be integrally formed with the peripheral walls (312, 412, 512).

As best shown in FIG. 7, each upper rib (160, 170) can include an upstream segment (176), which can upwardly extend from the outer surfaces (334, 434), between the inlet (320) of the inlet draft tube (320) and the intermediate draft tube (400), and a downstream segment (180), which can upwardly extend from the outer surfaces (434, 534) between the intermediate draft tube (400) and the outlet (530) of the outlet draft tube (500). As shown, the downstream segment (180) can extend from the upstream segment (176) at a divergence angle (07). The downstream segments (180) can thus tilt outwardly at an angle from the central axis (X) of the draft tubes (300, 400, 500). In one scenario, each upper rib (160, 170) can include a lower section (182) for connecting with the peripheral wall (312), a lower section (184) for connecting with the peripheral wall (412), as well as a lower section (186) for connecting with the peripheral wall (512). Indeed, the lower section (182) can be secured to the connecting member (370) which extends from the peripheral wall (312), the lower section (184) can be secured to the connecting member (470) which extends from the peripheral wall (412), and the lower section (186) can be secured to the connecting member (580) which extends from the peripheral wall (512). The lower sections (182, 184, 186) of the upper ribs (160, 170) can be secured to the connecting members (370, 470, 580) using suitable mechanical fasteners or other known techniques (e.g., by welding). It is also noted that the upper ribs (160, 170) can be integrally formed with the peripheral walls (312, 412, 512). The upper ribs (160, 170) can take any shape, size or configuration, as long as it can connect at least some of the stages or draft tubes together, as it can enhance water flow above the draft tubes, and/or as long as water can flow above the draft tubes with as little longitudinal obstructions as possible. For example, in one scenario, the upper ribs (160, 170) can be hydraulically profiled along the water flow direction (WF), at least in part.

In one implementation, the height (H) of the multi-staged cowl (100) can be between about 1 meter and about 10 meters, between about 2 meters and about 6 meters, or between about 3 meters and about 5 meters. For example, the overall height (H1) of inlet draft tube (300) can be between about 1 meter and about 10 meters, between about 2 meters and about 6 meters, or between about 3 meters and about 5 meters, the overall height (H2) of intermediate draft tube (400) can be between about 1 meter and about 10 meters, between about 2 meters and about 6 meters, or between about 3 meters and about 5 meters, while the overall height (H3) of outlet draft tube (500) can be between about 1 meter and about 10 meters, between about 2 meters and about 6 meters, or between about 3 meters and about 5 meters. Moreover, as mentioned above, the height (Hi1) at the inlet (320) can be slightly greater than the height (Ho1) at the outlet (330) of the inlet draft tube (300). For example, the height (Hi1) can be more than about 104% greater, more than about 108% greater, or more than about 112% greater than the height (Ho1) at the outlet (330). Also, the height of the intermediate draft tube (400) can decrease along its length (L2), or along the water flow direction (WF). For example, the height (Hi2) at the inlet (420) can be more than about 104%, more than about 108%, more than about 112%, or more than about 115% greater than the height (Ho2) at the outlet (430). Moreover, in one scenario, the height Ho3 at the outlet (530) can be greater than the height Ho2 at the outlet (430), and can substantially correspond to the height Hi2 at the inlet (420) of the intermediate draft tube (400). In one implementation, the height (Hi2) at the inlet (420) of the intermediate draft tube (400) can substantially correspond to the height (Hi1) at the inlet (320) of the inlet draft tube (300), whereas the height (Ho2) at the outlet (430) of the intermediate draft tube (400) can substantially correspond to the height (Ho1) at the outlet (430) of the inlet draft tube (300).

In one implementation, the width (Wi) at the inlet (110) can be between about 1 meter and about 10 meters, between about 2 meters and about 6 meters, or between about 3 meters and about 5 meters, while the width (Wo) at the outlet (120) can be between about 2 meters and about 20 meters, between about 8 meters and about 15 meters, or between about 10 meters and about 13 meters.

In one implementation, the width (Wi) at the inlet (110) can substantially correspond to the height (H) of the multi-staged cowl (100), while the width (Wo) of the multi-staged cowl (100) at the outlet (120) can be greater than the height (H) of the multi-staged cowl (100). For example, the width (Wo) at the outlet (120) can be at least about 1.5 times greater, at least about 2 times greater, or at least about 3 times greater than the height (H) of the multi-staged cowl (100). In one scenario, the width (Wo) at the outlet (120) can be at least 1.5 times greater, at least about 2 times greater, or at least about 3 times greater than the width (Wi) at the inlet (110) of the multi-staged cowl (100).

In one implementation, the width (Wi1) at the inlet (320) can substantially correspond to the height (Hi1) at the inlet (320), while the width (Wo1) at the outlet (330) can be greater than the height (Hi1) at the outlet (330). The width (Wo1) at the outlet (330) can be greater than the width (Wi1) at the inlet (320). For example, the width (Wo1) at the outlet (330) can be at least about 105%, at least about 110% or at least about 115% greater than the width (Wi1) at the inlet (320).

In one implementation, the width (Wi2) at the inlet (420) can be greater than the height (Hi2) at the inlet (420), while the width Wi2 at the inlet (420) can be greater than the width (Wo1) at the outlet (330). Also, the height (Hi2) at the inlet (420) can be greater than the height (Hi1) at the outlet (330). Moreover, the width (Wo2) at the outlet (430) can be greater than the height (Ho2) at the outlet (430). In one scenario, the width (Wo2) at the outlet (430) can be at least about 108%, at least about 115%, at least about 120%, at least about 130%, or at least about 140% greater than the width (Wi2) of the inlet (420).

In one implementation, the width (Wi3) at the inlet (520) can be greater than the height (Hi3) at the inlet (520), while the width (Wi3) at the inlet (520) can be greater than the width (Wo2) at the outlet (430). Also, the height (Hi3) at the inlet (520) can be greater than the height (Ho2) at the outlet (430). Moreover, the width (Wo3) at the outlet (530) can be greater than the height (Ho3) at the outlet (530). For example, the width (Wo3) at the outlet (530) can be at least about 108%, at least about 115%, at least about 120%, at least about 130%, or at least about 140% greater than the width (Wi3) at the inlet (520).

In one implementation, the length (L) of the multi-staged cowl (100) can be at least less than about 10 times greater, at least less than about 6 times greater, at least less than about 4 times greater, or at least less than about 2 times greater than the height (H) of the multi-staged cowl (100). It is noted that, due to the particular geometry of multi-staged cowl (100) (i.e., of the particular geometry of the draft tubes (300), (400), (500)), the ratio between the length (L) and the height (H) of multi-staged cowl (100), also known as the length to turbine diameter ratio, can be reduced with regards to known multi-staged cowls or draft tubes assemblies. For example, the length (L) of the multi-staged cowl (100) can be between about 2 meters and about 4 meters, between about 3 meters and about 6 meters, or between about 4 meters and about 8 meters. Also, it is noted that the length (L1) of the inlet draft tube (300) can be at least about 15%, at least about 20%, or at least about 30% of the length (L) of the multi-staged cowl (100), the length (L2) of the intermediate draft tube (400) can be at least about 5%, at least about 15%, or at least about 25% of the length (L) of the multi-staged cowl (100), and the length (L3) of the outlet draft tube (500) can be at least about 5%, at least about 15%, or at least about 25% of the length (L) of the multi-staged cowl (100).

In one implementation, the length (L2) of the intermediate draft tube (400) can be smaller than the length (L1) of the inlet draft tube (100). For example, the length (L2) can be at least less than about 80%, at least less than about 70%, at least less than about 60%, at least less than about 50%, or at least less than about 40% of the length (L1). Similarly, the length (L3) of the outlet draft tube (500) can be smaller than the length (L1) of the inlet draft tube (300). For example, the length (L3) can be at least less than about 80%, at least less than about 70%, at least less than about 60%, at least less than about 50%, or at least less than about 40% of the length (L1). In one scenario, the length (L3) of the outlet draft tube (500) can substantially correspond to the length (L2) of the intermediate draft tube (400).

Thus, in one implementation, and as best shown in FIGS. 1, 3 and 4, the inlet (110) of an upstream one of the stages (130) can have a substantially circular cross-section, while the outlet (120) of a downstream one of the stages (130) can have a substantially ellipse-shaped cross-section. Indeed, for example, the inlet (320) of the inlet draft tube (300) can have a substantially circular-shaped cross-section, the outlet (330) of the inlet draft tube (300) can have a substantially oval-shaped cross-section, the inlet (420) of the intermediate draft tube (400) can have a substantially ellipse-shaped cross-section, the outlet (430) of the intermediate draft tube (400) can have a substantially ellipse-shaped cross-section, the inlet (520) of the outlet draft tube (500) can have a substantially ellipse-shaped cross-section, and the outlet (530) of the outlet draft tube (500) can have a substantially ellipse-shaped cross-section.

It is also noted that the cross-section at the outlet (330) of the inner draft tube (300) can be a fraction in terms of percent of the cross-section at the inlet (420) of the intermediate draft tube (400), so water can flow through the inlet (420) thereof. Also, the cross-section at the outlet (430) of the intermediate draft tube (400) can be a fraction in terms of percent of the cross-section at the inlet (520) of the outlet draft tube (500), so water can flow through the inlet (520) thereof.

It is also noted that, in one implementation, the thickness of the peripheral walls (312, 412, 512) can vary along their lengths (L1, L2, L3) (or a segment thereof), or alternatively, can remain substantially constant along their lengths (L1, L2, L3). For example, the peripheral wall (312) forming the inlet draft tube (300) can have a thickness which can be greater at the inlet (320) than at the outlet (330). It is further noted that the peripheral walls (312, 412, 512) can take any shape, size or configuration, as long as it can provide the required structural and mass flow stability, eliminate vortices and avoid fluid separation and in particular, at the runner cross section of the multi-staged cowl (100).

As mentioned above, even though three stages (300, 400, 500) are illustrated in FIGS. 1 to 8, it is noted that two or more stages can be provided to form the multi-staged cowl. For example, the multi-staged cowl can include a first stage draft tube and a second stage draft tube so that only one water passage can be formed at the inlet of the second stage draft tube. In other scenarios, more than three stages can also be provided. For example, (n) stages can be provided so as to form (n−1) water passages in between the (n) stages.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Moreover, it will be appreciated that positional descriptions such as "above", "below", "upstream", "downstream", "left", "right" and the like should, unless otherwise indicated, be taken in the context of the figures only and should not be considered limiting. Moreover, the figures are meant to be illustrative of certain characteristics of the draft tubes assembly and are not necessarily to scale.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

It is to be understood that the phraseology and terminology employed herein is not to be construed as limiting and are for descriptive purpose only. The principles and uses of the teachings of the present disclosure may be better understood with reference to the accompanying description, figures and examples. It is to be understood that the details set forth herein do not construe a limitation to an application of the disclosure.

Furthermore, it is to be understood that the disclosure can be carried out or practiced in various ways and that the disclosure can be implemented in embodiments other than the ones outlined in the description above. It is to be understood that the terms "including", "comprising", and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. It will be appreciated that the methods described herein may be performed in the described order, or in any suitable order.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited by the scope of the appended claims.

The invention claimed is:

1. A multi-staged cowl for receiving at least part of a hydrokinetic turbine comprising a hub and blades radially extending therefrom, the multi-staged cowl comprising:
   an inlet;
   an outlet; and
   multiple discrete stages extending between the inlet and the outlet for receiving the hydrokinetic turbine therein, the multiple discrete stages defining a water flow channel for flow of water therethrough along a water flow direction from the inlet towards the outlet;
   wherein the multiple discrete stages define a height substantially constant along the water flow direction;
   wherein the cowl further includes an outer reinforcement structure for reinforcing the multiple discrete stages comprising a plurality of spaced apart upper ribs, the upper ribs each upwardly extending from the multiple discrete stages and adapted to facilitate water flow around the multiple discrete stages; and
   wherein at least one of the multiple discrete stages defines a width increasing non-linearly along the water flow direction.

2. The multi-staged cowl of claim 1, wherein the multiple discrete stages comprise an inlet draft tube comprising:
   an inlet draft tube inlet;
   an inlet draft tube outlet; and
   an inlet peripheral wall extending between the inlet draft tube inlet and the inlet draft tube outlet and defining an inlet water flow channel for flow of water therethrough along the water flow direction from the inlet draft tube inlet towards the inlet draft tube outlet, the inlet peripheral wall comprising an inner surface and an outer surface.

3. The multi-staged cowl of claim 2, wherein the multiple discrete stages further comprise an intermediate draft tube comprising:
   an intermediate draft tube inlet configured for receiving the inlet draft tube outlet;
   an intermediate draft tube outlet; and
   an intermediate peripheral wall extending between the intermediate draft tube inlet and the intermediate draft tube outlet and defining an intermediate water flow channel for flow of water therethrough along the water flow direction from the intermediate draft tube inlet towards the intermediate draft tube outlet, the intermediate peripheral wall comprising an inner surface and an outer surface.

4. The multi-staged cowl of claim 3, comprising a first water passage at the intermediate draft tube inlet formed between the outer surface of the inlet peripheral wall and the inner surface of the intermediate peripheral wall for flow of water therethrough from the intermediate draft tube inlet towards the intermediate draft tube outlet.

5. The multi-staged cowl of claim 4, wherein a cross-section at the intermediate draft tube inlet is greater than a cross-section at the inlet draft tube outlet.

6. The multi-staged cowl of claim 5, wherein the first water passage extends along a periphery of the inlet draft tube inlet.

7. The multi-staged cowl of claim 3, wherein the multiple discrete stages further comprise an outlet draft tube comprising:
   an outlet draft tube inlet configured for receiving the intermediate draft tube outlet;
   an outlet draft tube outlet; and
   an outlet peripheral wall extending between the outlet draft tube inlet and the outlet draft tube outlet and defining an outlet water flow channel for flow of water therethrough along the water flow direction from the outlet draft tube inlet towards the outlet draft tube outlet, the outlet peripheral wall comprising an inner surface and an outer surface.

8. The multi-staged cowl of claim 7, further comprising a second water passage at the outlet draft tube inlet formed between the outer surface of the intermediate peripheral wall and the inner surface of the outlet peripheral wall for flow of water therethrough from the outlet draft tube inlet towards the outlet draft tube outlet.

9. The multi-staged cowl of claim 8, wherein the cross-section at the outlet draft tube inlet is greater than the cross-section at the intermediate draft tube outlet.

10. The multi-staged cowl of claim 8, wherein the second water passage extends along a periphery of the intermediate draft tube inlet.

11. The multi-staged cowl of claim 7, wherein the intermediate draft tube defines an intermediate draft tube width increasing along the water flow direction according to a first non-linear relationship.

12. The multi-staged cowl of claim 7, wherein the outlet draft tube defines an outlet draft tube width increasing along the water flow direction according to a second non-linear relationship.

13. The multi-staged cowl of claim 12, wherein the outlet draft tube width increases from the outlet draft tube inlet towards the outlet draft tube outlet.

14. The multi-staged cowl of claim 7, wherein the inlet draft tube defines an inlet draft tube length and an inlet draft tube width increasing along a segment of the inlet draft tube length according to a third non-linear relationship.

15. The multi-staged cowl of claim 7, wherein a width of the multi-staged cowl at the outlet is greater than a height of the multi-staged cowl at the outlet.

16. The multi-staged cowl of claim 7, further comprising a base for supporting the multiple discrete stages thereon.

17. The multi-staged cowl of claim 16, wherein the base defines an opened configuration for allowing water to flow underneath the multiple discrete stages in the water flow direction along a length of the multiple discrete stages.

18. The multi-staged cowl of claim 17, wherein the base comprises a main frame for supporting the multiple discrete stages, and a plurality of supporting legs downwardly extending therefrom.

19. The multi-staged cowl of claim 17, wherein the base further comprises a levelling mechanism configured to level the multiple discrete stages relative to the water flow direction.

20. The multi-staged cowl of claim 7, further comprising a hub supporting structure extending from the multiple discrete stages for supporting the at least part of the hydrokinetic turbine in the multiple discrete stages, the hub supporting structure comprising a plurality of spaced apart hub supporting members, the supporting members each extending between the inner surface of the inlet draft tube and the hub.

21. The multi-staged cowl of claim 7, further comprising an inner reinforcement structure for reinforcing the multiple discrete stages, the inner reinforcement structure comprising a plurality of spaced apart struts, the struts each extending between a lower portion and an upper portion of the inner surface of the outlet draft tube.

* * * * *